United States Patent
Lim et al.

(10) Patent No.: US 9,531,812 B2
(45) Date of Patent: Dec. 27, 2016

(54) METHOD AND DEVICE FOR SETTING PRIORITY OF DATA TRANSMISSION

(71) Applicant: Samsung Electronics Co., Ltd., Gyeonggi-do (KR)

(72) Inventors: Han Na Lim, Seoul (KR); Song Yean Cho, Seoul (KR); Young Kyo Baek, Seoul (KR); Sang Soo Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 14/373,622

(22) PCT Filed: Jan. 18, 2013

(86) PCT No.: PCT/KR2013/000400
§ 371 (c)(1),
(2) Date: Jul. 21, 2014

(87) PCT Pub. No.: WO2013/109082
PCT Pub. Date: Jul. 25, 2013

(65) Prior Publication Data
US 2015/0009988 A1 Jan. 8, 2015

Related U.S. Application Data

(60) Provisional application No. 61/588,858, filed on Jan. 20, 2012, provisional application No. 61/645,839, filed on May 11, 2012.

(51) Int. Cl.
*H04L 12/28* (2006.01)
*H04L 12/56* (2006.01)
(Continued)

(52) U.S. Cl.
CPC ............. *H04L 67/141* (2013.01); *H04L 47/20* (2013.01); *H04L 47/2408* (2013.01);
(Continued)

(58) Field of Classification Search
CPC ........ H04L 45/00; H04L 47/10; H04L 49/351; H04L 29/0653; H04L 29/06
See application file for complete search history.

(56) References Cited

U.S. PATENT DOCUMENTS

| 6,795,870 B1* | 9/2004 | Bass ................... H04L 12/5693 709/233 |
| 8,509,218 B2* | 8/2013 | Bhatia ................. H04L 45/3065 370/352 |

(Continued)

FOREIGN PATENT DOCUMENTS

| CN | 1801819 | 7/2006 |
| CN | 101755422 | 6/2010 |

(Continued)

OTHER PUBLICATIONS

International Search Report dated Apr. 26, 2013 in connection with International Patent Application No. PCT/KR2013/000400, 5 pages.
(Continued)

*Primary Examiner* — Mark Rinehart
*Assistant Examiner* — Sanjay K Dewan

(57) ABSTRACT

A method and a device for setting priority of data transmission are provided. A terminal, which is set to transmit low priority data to a network, transmits a connection request to the network in order to transmit normal-priority data, and receives and stores priority information on data transmission from the network.

20 Claims, 17 Drawing Sheets

(51) Int. Cl.
*H04L 29/08* (2006.01)
*H04L 12/927* (2013.01)
*H04W 28/02* (2009.01)
*H04L 12/833* (2013.01)
*H04L 12/813* (2013.01)
*H04L 12/851* (2013.01)

(52) U.S. Cl.
CPC ........ *H04L 47/2458* (2013.01); *H04L 47/805* (2013.01); *H04L 67/322* (2013.01); *H04W 28/0215* (2013.01)

(56) References Cited

U.S. PATENT DOCUMENTS

| | | | | |
|---|---|---|---|---|
| 8,554,216 | B2* | 10/2013 | Ronneke | H04W 72/1242 370/230.1 |
| 8,811,317 | B2* | 8/2014 | Liang | H04W 48/20 370/216 |
| 2004/0229626 | A1* | 11/2004 | Yi | H04W 76/02 455/450 |
| 2007/0041401 | A1 | 2/2007 | Kaneda et al. | |
| 2007/0143290 | A1 | 6/2007 | Fujimoto et al. | |
| 2007/0225012 | A1 | 9/2007 | Chang et al. | |
| 2008/0310303 | A1 | 12/2008 | Wang et al. | |
| 2009/0116380 | A1 | 5/2009 | Santiago et al. | |
| 2009/0285377 | A1* | 11/2009 | Sennett | H04W 76/007 379/201.04 |
| 2009/0290565 | A1 | 11/2009 | Mangetsu | |
| 2010/0151868 | A1* | 6/2010 | Shinozaki | H04M 3/42059 455/445 |
| 2011/0159839 | A1* | 6/2011 | Mcewen | H04W 4/22 455/404.1 |
| 2011/0199905 | A1* | 8/2011 | Pinheiro | H04W 4/005 370/235 |
| 2012/0094680 | A1* | 4/2012 | Stackelius | H04W 72/1242 455/452.1 |
| 2012/0230217 | A1* | 9/2012 | Sawai | H04L 5/001 370/252 |
| 2012/0315907 | A1* | 12/2012 | Chin | H04W 36/22 455/436 |
| 2013/0012204 | A1* | 1/2013 | Kim | H04W 4/005 455/435.1 |
| 2013/0182644 | A1* | 7/2013 | Kim | H04W 76/025 370/328 |
| 2014/0341041 | A1* | 11/2014 | Velev | H04Q 3/0045 370/236 |
| 2014/0369190 | A1* | 12/2014 | Chan | H04L 47/24 370/230 |

FOREIGN PATENT DOCUMENTS

| | | |
|---|---|---|
| EP | 1 755 291 A2 | 2/2007 |
| JP | 2011-142463 | 7/2011 |

OTHER PUBLICATIONS

Written Opinion of International Searching Authority dated Apr. 26, 2013 in connection with International Patent Application No. PCT/KR2013/000400, 4 pages.

3GPP TR 23.888 V1.0.0, "3GPP; TSG-SA; System Improvements for Machine-Type Communications (Release 10)", Jul. 2010, 80 pages.

3GPP TR 23.854 V11.0.0, "3GPP; TSG-SA; Enhancements for Multimedia Priority Service (Release 11)", Jun. 2011, 41 pages.

Extended European Search Report, dated Jul. 31, 2015, in connection with European Application No. 13738049.9, 6 pages.

First Office Action dated Jul. 22, 2016 in connection with Chinese Application No. 2013800144389, 16 pages.

\* cited by examiner

FIG. 3

| Field | Description |
|---|---|
| ■ For each active PDN connection: | |
| ■ APN in Use | The APN currently used. This APN shall be composed of the APN Network Identifier and the default APN Operator Identifier, as specified in TS 23.003 [9], clause 9.1.2. Any received value in the APN OI Replacement field is not applied here. |
| ■ APN Restriction | Denotes the restriction on the combination of types of APN for the APN associated with this EPS bearer Context. |
| ■ APN Subscribed | The subscribed APN received from the HSS. |
| ■ APN Type | IPv4, IPv6 or IPv4v6 |
| ■ IP Address(es) | IPv4 address and/or IPv6 prefix |
| | NOTE: The MME might not have information on the allocated IPv4 address. Alternatively, following mobility involving a pre-release 8 SGSN, this IPv4 address might not be the one allocated to the UE. |
| ■ EPS PDN Charging Characteristics | The charging characteristics of this PDN connection, e.g. normal, prepaid, flat-rate and/or hot billing. |
| ■ APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| ■ SIPTO permissions | Indicates whether the traffic associated with this APN is allowed or prohibited for SIPTO |
| ■ LIPA permissions | Indicates whether the PDN can be accessed via Local IP Access. Possible values are: LIPA-prohibited, LIPA-only and LIPA-conditional. |
| ■ VPLMN Address Allowed | Specifies whether the UE is allowed to use the APN in the domain of the HPLMN only, or additionally the APN in the domain of the VPLMN. |
| ■ PDN GW Address in Use (control plane) | The IP address of the PDN GW currently used for sending control plane signalling. |
| ■ PDN GW TEID for S5/S8 (control plane) | PDN GW Tunnel Endpoint identifier for the S5/S8 interface for the control plane. [For GTP-based S5/S8 only] |
| ■ MS Info Change Reporting Action | Need to communicate change in User Locatio information to the PDN GW with this EPS bearer Context. |
| Access priority ~310 | Indicates the low priority UE is allowed to access the network ~320 |

FIG. 4

| Field | Description |
|---|---|
| • For each active PDN connection: | |
| • APN in Use | The APN currently used. This APN shall be composed of the APN Network identifier and the default APN Operator identifier, as specified in TS 23.003 [9], clause 9.1.2. |
| • APN-AMBR | The maximum aggregated uplink and downlink MBR to be shared across all Non-GBR bearers, which are established for this APN |
| • Assigned PDN Type | The PDN Type assigned by the network (IPv4, IPv6, or IPv4v6). |
| • IP Address(es) | IPv4 address and/or IPv6 prefix |
| • Default Bearer | Identifies the default bearer within the PDN connection by its EPS Bearer Id. The default bearer is the one which is established first within the PDN connection. |
| Access priority ~410 | Indicates the low priority UE is allowed to access the network ~420 |
| • For each EPS Bearer within the PDN connection | |
| • EPS Bearer ID | An EPS bearer identity uniquely identifies an EPS bearer for one UE accessing via E-UTRAN. |
| • TI | Transaction Identifier |
| • EPS bearer QoS | GBR and MBR for GBR bearer. |
| • TFT | Traffic Flow Template. |

FIG. 6

| Field | Description |
|---|---|
| • For each EPS Bearer within the PDN connection | |
| ▪ EPS Bearer ID | An EPS bearer identity uniquely identifies an EPS bearer for one UE accessing via E-UTRAN. |
| ▪ TI | Transaction Identifier |
| ▪ EPS bearer QoS | GBR and MBR for GBR bearer. |
| ▪ TFT | Traffic Flow Template. |
| Access priority ~610 | Indicates the low priority UE is allowed to access the network ~620 |

FIG. 7

| | | |
|---|---|---|
| 710 → | Packet filter identifier 1 | Octet 4 |
| | Packet filter evaluation precedence 1 | Octet 5 |
| | Length of Packet filter contents 1 | Octet 6 |
| | Packet filter contents 1 | Octet 7 |
| | | Octet m |
| | Packet filter identifier 2 | Octet m+1 |
| | Packet filter evaluation precedence 2 | Octet m+2 |
| | Length of Packet filter contents 2 | Octet m+3 |
| | Packet filter contents 2 | Octet m+4 |
| | | Octet n |
| | ... | Octet n+1 |
| | | Octet y |
| 720 → | Packet filter identifier N | Octet y+1 |
| | Packet filter evaluation precedence N | Octet y+2 |
| | Length of Packet filter contents N | Octet y+3 |
| | Packet filter contents N | Octet y+4 |
| | | Octet z |
| 715 → | Access priority for filter1 | |
| | ..... | |
| 725 → | Access priority for filterN | |

FIG. 10

| Field | Description |
|---|---|
| ▪ IMSI | IMSI is the main reference key. |
| ▪ MSISDN | The basic MSISDN of the UE (Presence of MSISDN is optional) |
| ▪ IMEI / IMEISV | International Mobile Equipment Identity – Software Version Number |
| ▪ MME Identity | The Identity of the MME currently serving this UE |
| ▪ MME Capabilities | Indicates the capabilities of the MME with respect to core functionality e.g. regional access restrictions. |
| ▪ Access priority — 1010 | Indicates that low priority UE is allowed to access the network — 1020 |

FIG. 11

```
APN-Configuration ::= <AVP header: 1430 10415>
            { Context-Identifier }
            * 2 [ Served-Party-IP-Address ]
            { PDN-Type }
            { Service-Selection}
            [ EPS-Subscribed-QoS Profile ]
            [ VPLMN-Dynamic-Address-Allowed ]
            [MIP6-Agent-Info ]
            [ Visited-Network-Identifier ]
            [ PDN-GW-Allocation-Type ]
            [ 3GPP-Charging-Characteristics ]
            [ AMBR ]
            *[ Specific-APN-Info ]
            [ APN-OI-Replacement ]
            [ SIPTO-Permission ]
            [ LIPA-Permission ]
            [ Low priority indication ]         ~1110
            [ Low priority over-riding flag ]   ~1120
            [ APN-AMBR for normal priority ]    ~1130
            *[ AVP ]
```

METHOD AND DEVICE FOR SETTING PRIORITY OF DATA TRANSMISSION

CROSS-REFERENCE TO RELATED APPLICATION(S)

The present application claims priority under 35 U.S.C. §365 to International Patent Application No. PCT/KR2013/000400 filed Jan. 18, 2013, entitled "METHOD AND DEVICE FOR SETTING PRIORITY OF DATA TRANSMISSION". International Patent Application No. PCT/KR2013/000400 claims priority under 35 U.S.C. §365 and/or 35 U.S.C. §119(e) to U.S. Provisional Patent Application No. 61/588,858 filed Jan. 20, 2012, and 61/645,839 filed May 11, 2012, and which are incorporated herein by reference into the present disclosure as if fully set forth herein.

TECHNICAL FIELD

The present invention relates to data transmission prioritization method and apparatus and, in particular, to a method and apparatus of allowing a terminal configured for low priority data transmission to transmit normal priority data.

BACKGROUND ART

A machine type communication terminal can be categorized into a low priority terminal as compared to the normal terminal such as smartphone according to the configuration of the operator. If network overload occurs, the data generated by the low priority terminals are classified into low priority data entirely.

Accordingly, if a low priority terminal attempts network connection or data transmission, the network sets a backoff timer for the corresponding terminal and allows, when the backoff timer expires, the terminal to connect to the network or transmit data. That is, when the network overload occurs, the network restricts the attachment or data transmission of the low priority terminal first.

The data transmission of the low priority terminal is restricted to emergency call placement only. In order to place the emergency call, the terminal or the network has to be able to recognize the emergency call. That is, if the user places an emergency call, the modem of the terminal identifies the emergency call and sends the network an explicit emergency call indicator. Accordingly, the network can recognize the emergency call request from the terminal and allows the emergency call to be made.

Meanwhile, there may be a case where the low priority terminal attempts to transmit to the network a normal priority data which is generated in response to a request of an application but not in an emergency call situation. Such a situation is likely to occur at a machine type terminal.

A vending machine is classified into a low priority terminal which reports sales figures to the management server 12 times a day. The sales report transmitted by the vending machine is classified into low priority data and thus a backoff timer is set in the network overload situation. However, it is necessary to classify the information on the goods out of stock or equal to or less than a predetermined amount into normal priority data such that the network allows for the delivery of this normal priority data.

However, the aforementioned current technology cannot transmit the normal priority data of the low priority terminal with the exception of the emergency call. That is, the low priority terminal does not know whether it is allowed for transmitting normal priority data and, even though the normal data transmission is allowed, there is no way of indicating whether the transmission data has low or normal priority.

DISCLOSURE OF INVENTION

Technical Problem

The present invention has been conceived to solve the above problem and aims to provide a method and apparatus for a low priority terminal to generate and transmit normal priority data to the network.

Solution to Problem

In accordance with an aspect of the present invention, a method for transmitting normal priority data at a terminal configured to transmit low priority data to a network includes transmitting a connection request to the network, receiving priority information for data transmission from the network, and storing the received priority information.

In accordance with another aspect of the present invention, a method for processing normal priority data received from a terminal configured to transmit low priority data includes receiving a connection request from the terminal, checking priority information on data transmission of the terminal based on one of subscriber information of the terminal and an operator policy in response to the connection request, and transmitting the checked priority information to the terminal.

In accordance with another aspect of the present invention, an apparatus for transmitting normal priority data, the apparatus being included in a terminal configured to transmit low priority data to a network includes a radio communication unit which transmits and receives messages and data to and from the network, a control unit which controls transmitting a connection request to the network and receiving priority information for data transmission from the network, and a storage unit which store the received priority information.

In accordance with still another aspect of the present invention, an apparatus for processing normal priority data received from a terminal configured to transmit low priority data includes an interface unit which transmits and receives messages and data to and from the terminal and a control unit which controls receiving a connection request from the terminal, checks priority information on data transmission of the terminal based on one of subscriber information of the terminal and an operator policy in response to the connection request, and controls transmitting the checked priority information to the terminal.

Advantageous Effects of Invention

The data transmission prioritization method and apparatus of the present invention is advantageous in terms of allowing a terminal configured for low priority data transmission to transmit normal priority data in such a way of determining, when normal priority data occurs, whether the normal priority connection is available and handling the normal priority data depending on the determination result.

BRIEF DESCRIPTION OF DRAWINGS

FIG. 3 is a diagram illustrating a format the access priority information per UE which is stored in the MME according to an embodiment of the present invention;

FIG. 4 is a diagram illustrating a format of the access priority information stored in the UE according to an embodiment of the present invention;

FIG. 6 is a diagram illustrating a format of the access priority information stored in the bearer context of the UE according to an embodiment of the present invention;

FIG. 7 is a diagram illustrating a format of a packet filter including the access priority information according to an embodiment of the present invention;

FIG. 10 is a diagram illustrating a format of the access priority information stored in the HSS according to an embodiment of the present invention;

FIG. 11 is a diagram illustrating an APN-configuration AVP defined newly in the present invention;

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the embodiments of the present invention are directed to the Evolved Packet System (EPS), it will be understood by those skilled in the art that the present invention can be applied even to other communication systems having the similar technical background and channel format, with a slight modification, without departing from the spirit and scope of the present invention.

In the communication system to which the present invention is applied, the low priority terminal (hereinafter, referred to as just 'terminal') performing machine-type communication and transmitting low priority data to the network receives priority information transmitted by the network for use in transmission of normal priority data and transmits normal priority data to the network based on the priority information.

The priority information transmitted from the network to the terminal may be configuration information per PDN, EPS bearer, or IP flow of the terminal. Here, one PDN connection may be made up of a plurality of EPS bearers, and one EPS bearer may be made up of a plurality of IP flows.

The terminal sends the network an Attach Request or data transmission request based on the priority information configured as above, and the network determines whether to accept or reject the request from the terminal based on the priority information. Descriptions are made of the operations of the terminal and network according to the present invention hereinafter.

In the first embodiment of configuring access priority information to the terminal per PDN connection, the network may configure the access priority information to the terminal through OMA-DM. In detail, the home network of the terminal may configure the access priority to the terminal per PDN connection through OMA-DM.

It is possible to check the access priority information configured to the terminal depending on whether the PDN connection information transmitted from the network to the terminal includes a low priority indicator. It is also possible to determine the priority by checking whether the PDN connection information includes a low priority indicator or a normal priority indicator.

Figure 1:
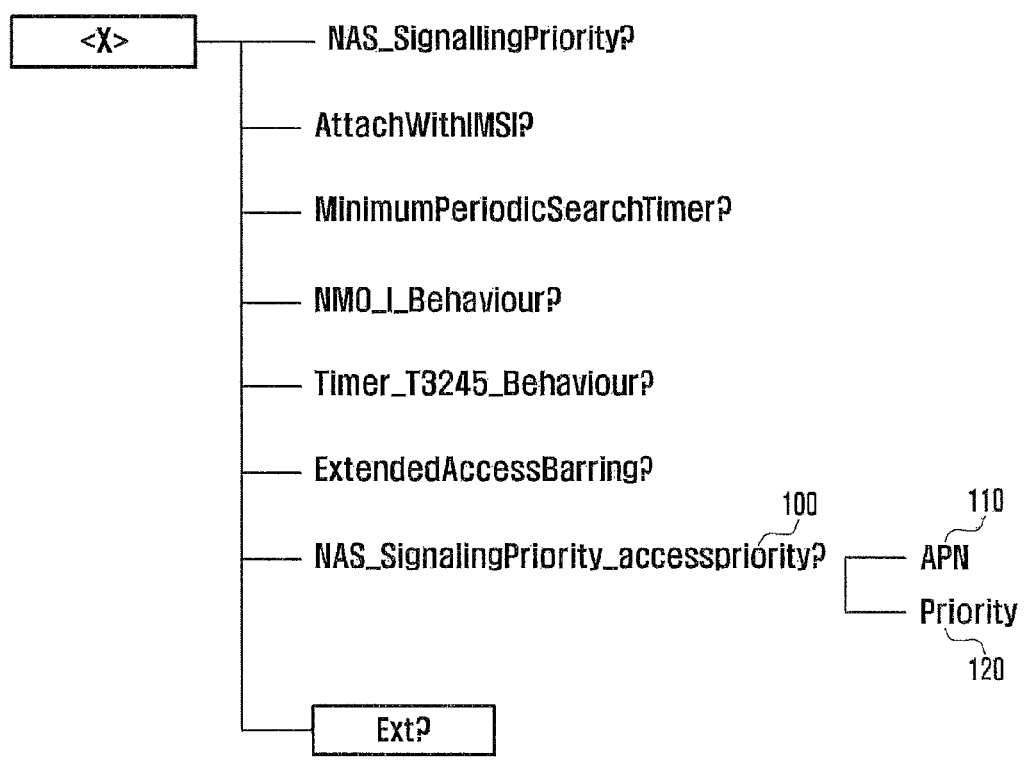
FIG. 1 is a diagram illustrating a NAS configuration Management Object (NAS configuration MO) configured in the terminal through OMA-DM.

FIG. 1 is a diagram illustrating a NAS configuration Management Object (NAS configuration MO) configured in the terminal through OMA-DM.

Referring to FIG. 1, "NAS_SignalingPriority_accesspriority" 100 denotes a leaf indicating the access priority of the terminal. If there is the leaf 100 in the message received through OMA-DM, the terminal may determine whether to access the network configuration value of the leaf 100.

For example, if APN 110 is set to internet and Priority 120 is set to low priority indicator in FIG. 1, the terminal requests for connection to Internet through a PDN with low priority. In another example, if APN 110 is set to machine and Priority 120 is set to normal priority indicator or non-low priority indicator, the terminal requests for a machine PDN for connection with normal priority. The expressions such as internet and low priority indicator may be stored in various types of texts or numbers.

In another embodiment where the network configures the access priority information to the terminal per PDN, it is possible for a network entity such as Mobility Management Entity (MME) and Policy and Charging Rules Function (PCRF) to configure the access priority information in response to the Attach Request of the terminal.

In the second embodiment for the network to configure the access priority information to the terminal per PDN connection, the MME may determine the access priority information according to the subscription data and/or operator policy in response to the Attach or PDN connectivity Request message from the terminal.

Figure 2:
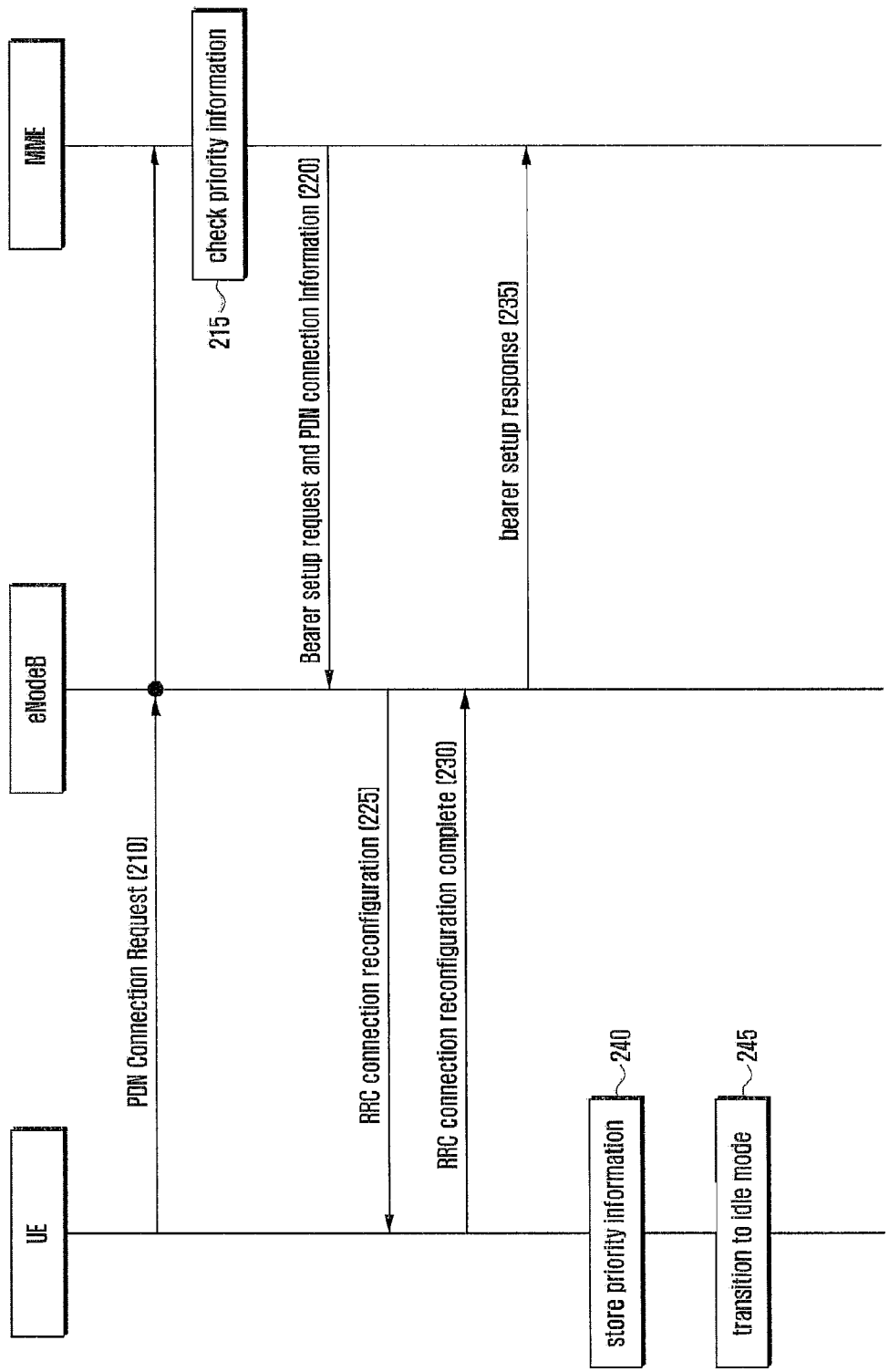
FIG. 2 is a diagram illustrating a procedure for an MME to configure access priority information to the terminal.

FIG. 2 is a diagram illustrating a procedure for an MME to configure access priority information to the terminal.

Referring to FIG. 2, a User Equipment (UE) sends an MME a PDN Connectivity Request via an evolved Node B (eNodeB) at step 210. The MME checks the access priority information of the UE based on APN from which the Attach Request is transmitted at step 215. The access priority information is checked based on the subscriber information of the UE and/or operator policy, and the subscription information may be stored in HSS in the initial attach of the UE and the preconfigured operator policy may be stored in the MME in advance.

In order to clarify of the subject matter of the present invention, the session establishment procedure between the MME and PDN Gateway (GW) via Serving Gateway (GW) and the IP-CAN establishment procedure between MME and PCRF that are performed in compliance with well-known technologies are omitted in drawings and detailed description.

The MME stores the access priority information determined based on the subscriber information and/or operator policy in the form of UE context and sends the UE a Bearer Setup Request and PDN Connection Information including the access priority information at step 220.

FIG. 3 is a diagram illustrating a format the access priority information per UE which is stored in the MME according to an embodiment of the present invention. Referring to FIG. 3, the context includes the access priority field 310 as a part of each PDN connectivity information of the UE in the context to indicate the network access allowance for the low priority UE as denoted by reference number 320.

Returning to FIG. 2, if an RRC Connection Reconfiguration message including the access priority information is received from the eNodeB at step 225, the UE sends the eNodeB an RRC Connection Reconfiguration Complete message at step 230 and stores the access priority information as the context of the established PDN connection at step 240. Then eNodeB sends the MME a Bearer Setup Response to the MME at step 235.

FIG. 4 is a diagram illustrating a format of the access priority information stored in the UE according to an embodiment of the present invention. Referring to FIG. 4, an access priority field 410 is included in the context as a part of the PDN connectivity information of the UE, and it corresponds to the access priority field 310 of the context stored in the MME as shown in FIG. 3. In FIG. 4, the access priority field 410 indicates network access allowance for the low priority UE as denoted by reference number 420.

Returning to FIG. 2, after completing the receipt of the access priority information from the MME, the UE enters the idle mode at step 245.

In the third embodiment for the network to configure the access priority information to the UE per PDN, a PCRF may determine the access priority based on the subscriber information of the UE and/or the operator policy in response to the IP-CAN Session Establishment or Modification Request from the UE.

Figure 5:
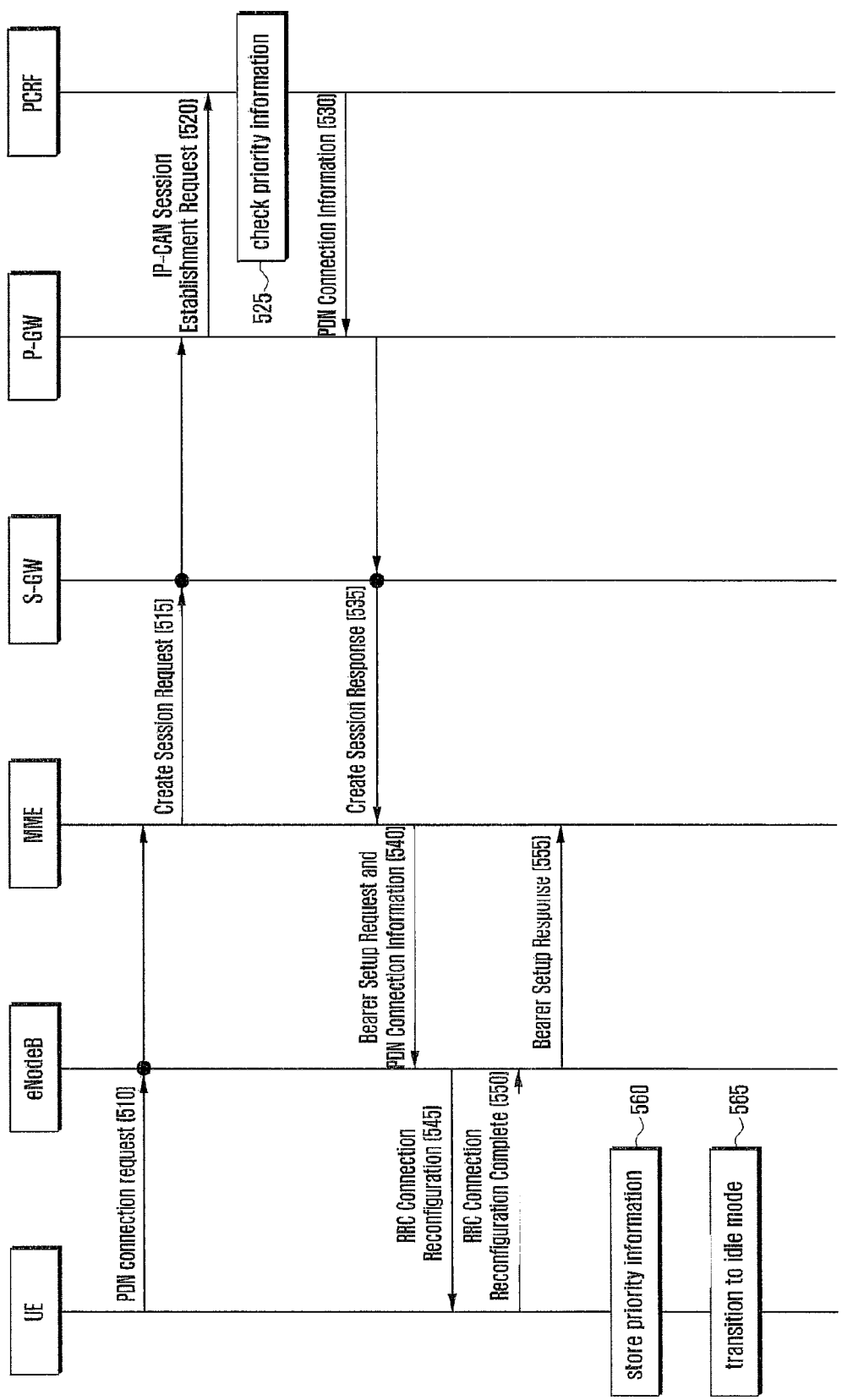
FIG. 5 is a signal flow diagram illustrating a procedure for the PCRF to configure access priority information to the UE.

FIG. 5 is a signal flow diagram illustrating a procedure for the PCRF to configure access priority information to the UE.

Referring to FIG. 5, the UE sends the MME a PDN Connectivity Request via the eNodeB at step 510. Unlike the embodiment of FIG. 2, the MME sends the Serving GW (SGW) a Create Session Request as in the legacy PDN Connection and the SGW forwards the Create Session Request to the PDN GW (PGW) at step 515. The PGW sends the PCRF an IP-CAN Session Establishment Request to acquire a PDN connection policy at step 520.

The PCRF checks the access priority information of the UE based on the APN with the Attach Request is transmitted at step 525. The access priority information is checked based on the subscriber information of the UE and/or the operator policy, the subscriber information may be stored in the HSS in the initial attach of the UE, and the operator policy information may be stored in the PCRF in advance.

The PCRF sends the PGW the PDN Connectivity Information including the determined access priority information at step 530, and the PGW sends the SGW a Create Session Response including the access priority information at step 535. The SGW forwards the Create Session Response to the MME.

The MME sends the eNodeB a Bearer Setup Request and PDN connectivity information at step 540, the eNodeB sends the UE an RRC Connection Reconfiguration including the access priority information, and the UE sends the eNodeB an RRC Connection Reconfiguration Complete message at step 550 and stores the access priority information received form the eNodeB in the context of PDN connectivity at step 560. Meanwhile, the eNodeB sends the MME a Bearer Setup Response at step 555. Since the access priority information handling procedure of the UE has been described with reference to FIG. 2, detailed description thereof is omitted herein. After receiving the access priority information from the PCRF, the UE enters the idle mode at step 565.

As described in the above embodiment of the present invention, the UE may determine the access priority depending on when the PDN connectivity information received from the network includes the low priority indicator. It is also possible to determine the priority depending on whether the PDN connection information includes a low priority indicator or a normal priority indicator.

The UE also may receive the access priority information per EPS bearer from the network. Like the above-described embodiment of configuring the access priority per PND connection, the UE may receive the access priority information through OMA-DM or the access priority checked by the MME or PCRF.

In the first embodiment for the network to configure the access priority information to the UE per EPS bearer, a home operator may configure a QoS Class Identifier (QCI) Reference Value in the UE through OMA-DM. The UE may determine the access priority by comparing the QCI Reference Value and the QCI value in the Attach Request.

For example, if the QCI value of the EPS bearer for connection is less than the QCI Reference Value configured through OMA-DM, the UE may classify the priority of the corresponding connection into low priority. If the CQI value of the EPS bearer for connection is greater than the QCI Reference Value, the UE may classify the priority of the corresponding connection into normal priority.

In another embodiment of configuring the access priority through the OMA-DM, it is possible to configure an Address Resolution Protocol (ARP) value in addition to the QCI value or configure both the CQI and ARP values into Reference Value.

In the second embodiment for the network to configure the access priority information to the UE per EPS bearer, the MME may check the access priority of the EPS bearer generated according to the subscriber information of the UE and/or the operator policy in the EPS bearer establishment procedure. That is, the connection establishment procedure between the UE and the network is identical with that as described with reference to FIG. 2, and the MME checks the access priority of the UE per EPS bearer other than PDN connection.

The MME stores the determined access priority as the bearer context and sends the UE the access priority information. The UE stores the received access priority information as the bearer context of the established EPS bearer.

FIG. 6 is a diagram illustrating a format of the access priority information stored in the bearer context of the UE according to an embodiment of the present invention. Referring to FIG. 6, the context is stored per EPS bearer in the PDN connection, and the access priority field 610 is included in the context. The access priority field 610 indicates the network access allowance 620 of the low priority UE.

In the third embodiment for the network to configure the access priority information to the UE per EPS bearer, the PCRF may check the access priority of the UE based on the subscriber information of the UE and/or the operator policy in response to the IP-CAN Session Establishment or Modification Request received from the UE via the eNodeB, MME, SGW, and PGW.

The PDN connection establishment between the UE and the network is identical with that of FIG. 5, and the PCRF checks and transmit the access priority of the UE per EPS bearer other than PDN connection.

The PCRF sends the PGW the determined access priority, and the PGW forwards the access priority to the MME via the SGW. The MME stores the access priority information in the bearer context of the MME and sends the access priority information to the UE. The UE stores the access priority information as the context of the generated EPS bearer.

According to the above-described embodiment of the present invention, the UE may determine the access priority depending on whether EPS bearer information includes the low priority indicator. It is also possible to determine the priority by checking whether the EPS bearer information includes a low priority indicator or a normal priority indicator.

The UE may receive the access priority information configured per IP flow. In the case that the network configures the access priority per IP flow, the home operator or the PCRF may send the UE the configuration information through OMA-DM.

In the first embodiment for the network to configure the access priority information to the UE per IP flow, the home operator may configure a packet filter or TFT including access priority in the UE through OMA-DM. The UE may configure the access priority per IP flow based on the configuration value.

In the second embodiment for the network to configure the access priority information to the UE per IP flow, if the UE requests for IP-CAN Session Establishment or Modification via eNodeB, MME, SGW, and PGW, the PCRF may check the access priority based on the subscriber information of the UE and/or operator policy. The PDN connection establishment procedure between the UE and the network is identical with the procedure described with reference to FIG. 5, and the PCRF checks and transmits the access priority of the UE per IP flow other than PDN connection.

The PCRF stores the determined access priority in a packet filter structure and sends the PGW the access priority. The PGW forwards the access priority to the MME via the SGW. The MME stores the access priority in the context within the MME and sends the UE the access priority. The UE receives the access priority in the form of a packet filter or TFT and stores the access priority as a context.

FIG. 7 is a diagram illustrating a format of a packet filter including the access priority information according to an embodiment of the present invention. Referring to FIG. 7, the access priority information includes N packet filters information from the packet filter identifier 1 710 to the packet filter identifier N 720 and N access priority information 725 from the access priority for filter 1 715 to the access priority for filter N 725.

As described above, any data to be transmitted to the network occurs after the receipt of the access priority information from the network, the UE sends the network an Attach Request based on the stored access priority information. Descriptions are made of the data transmission procedure of the UE based on the access priority information and the data processing procedure of the network hereinafter.

If any data to be transmitted occurs after the UE has stored the received access priority information and entered the idle mode, it determines whether the data to be transmitted belongs to 1) which PDN connection or 2) which EPS bearer or 3) which packet filter depending on when the access priority is configured 1) per PDN connection or 2) per EPS bearer or 3) for IP flows and sends the network a Attach Request including the data and the access priority information corresponding to the data.

According to the above-described embodiments of the present invention, the access priority information transmitted by the UE may include a low priority indicator or not. According to another embodiment of the present invention, the access priority information transmitted by the UE may include a low priority indicator or normal priority indicator. That is, the UE may send the network the Attach Request including the access priority information with or without the low priority indicator or with the normal priority indicator.

Figure 8:
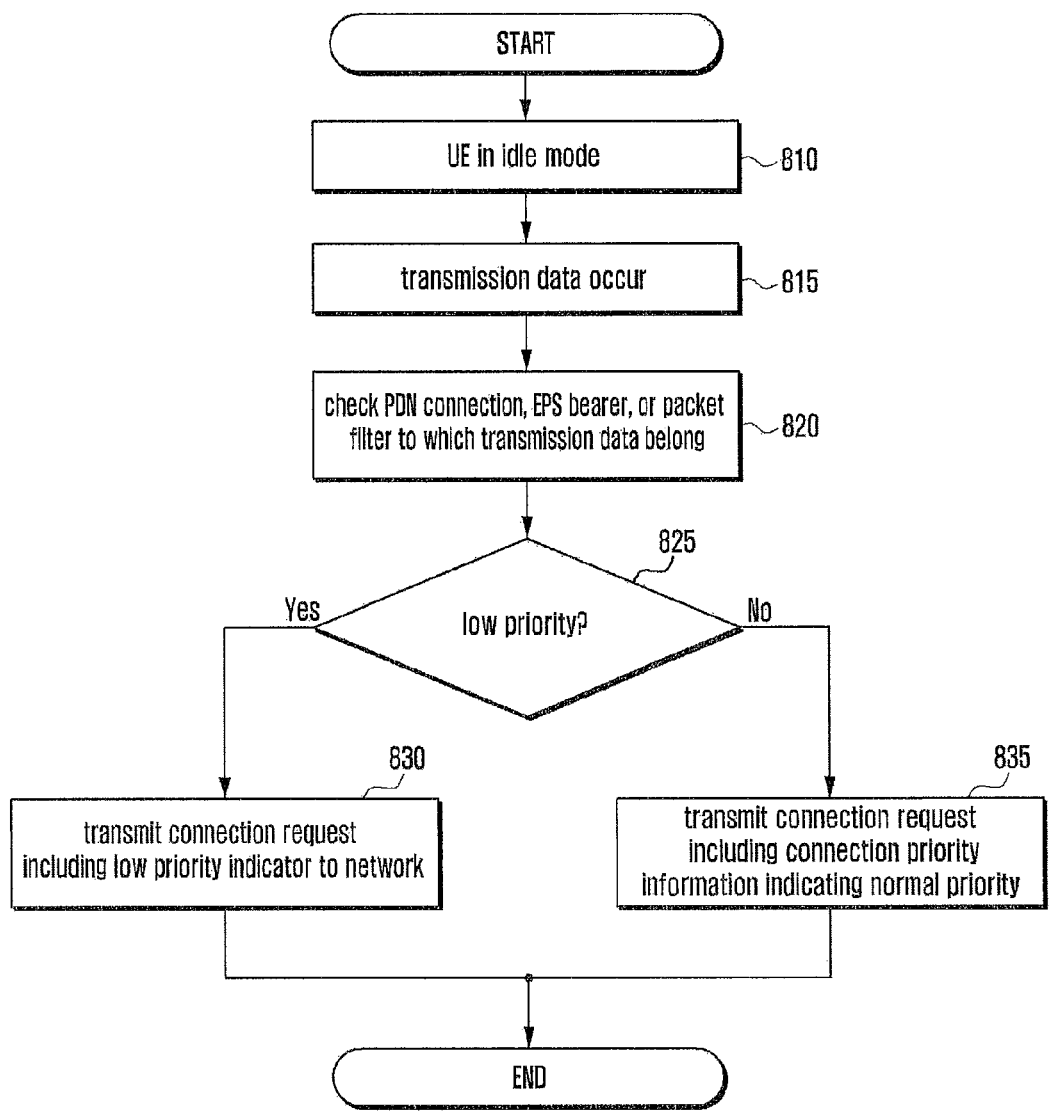
FIG. 8 is a flowchart illustrating a procedure for the UE to transmit data based on the access priority information according to an embodiment of the present invention.

FIG. 8 is a flowchart illustrating a procedure for the UE to transmit data based on the access priority information according to an embodiment of the present invention.

Referring to FIG. 8, the UE is in the idle state after storing the received access priority information at step 810. At step 815, any data to be transmitted to the network occur in the UE. For example, an application installed in the UE generates data.

The UE checks the PDN connection, EPS bearer, or the packet filter to which the data to be transmitted belongs at step 820. The UE checks the access priority of the PDN connection, EPS bearer, or packet filter to which the data belongs at step 825.

If the access priority is the low priority, the UE transmits an RRC Connection Establishment message including the low priority indicator along with a NAS message at step 830. If the access priority is the normal priority, the UE transmits the RRC Connection Establishment message indicating the normality priority, i.e. without the low priority indicator or with the normal priority indicator, along with the NAS message. The message transmitted from the UE to the network may be a message for other purpose as well as the Attach Request message.

Figure 9:
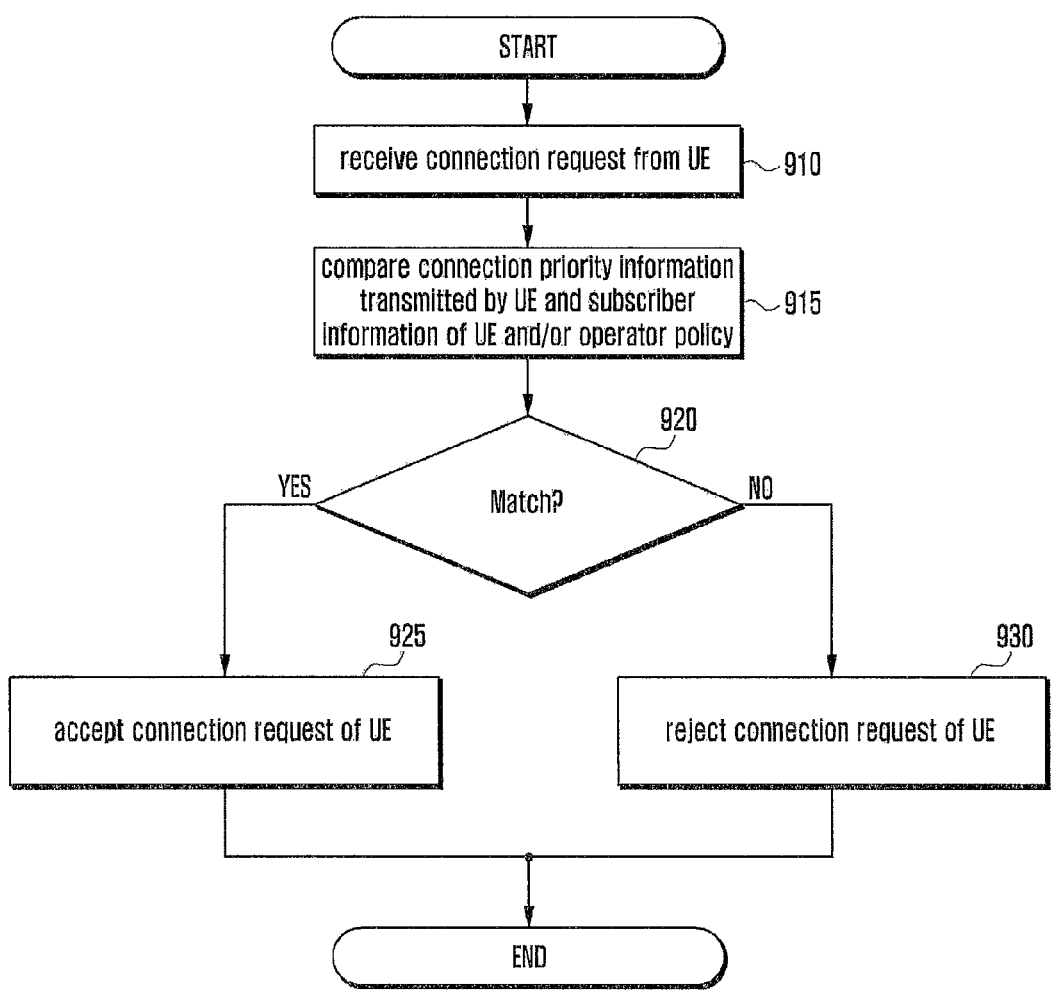
FIG. 9 is a flowchart illustrating a procedure for the network to process the message transmitted by the UE based on the access priority information according to an embodiment of the present invention.

FIG. 9 is a flowchart illustrating a procedure for the network to process the message transmitted by the UE based on the access priority information according to an embodiment of the present invention. The embodiment of FIG. 9 is directed to the procedure performed by the MME among the network entities.

Referring to FIG. 9, the MME receives an Attach Request form the UE at step 910. At this time, the UE may be in the idle mode as described with reference to FIG. 8. The MME compares the access priority information transmitted by the UE with the subscriber information stored in the HSS and/or the operator policy stored in the MME at step 915.

In detail, the subscriber information is stored in the HSS and transferred from the HSS to the MME in the initial attach procedure of the UE. As described above, the subscriber information may include the access priority determined for the UE. That is, the subscriber information may include the information on whether attach to the network is allowed with the corresponding access priority.

FIG. 10 is a diagram illustrating a format of the access priority information stored in the HSS according to an embodiment of the present invention. Referring to FIG. 10, the subscriber information of the UE which is stored in the HSS may include the access priority field 1010. The access priority field 1010 indicates the network access allowance 1020 of the low priority UE. The access priority field 1010 corresponding to the access priority information stored in the context of the MME and UE as shown in FIGS. 3, 4, and 6.

Returning to FIG. 9, if the access priority information transmitted by the UE matches the subscriber information and/or operator policy at step 920, the MME accepts the Attach Request of the UE at step 925. Otherwise if the informations mismatch each other at step 920, the MME rejects the Attach Request of the UE at step 930.

For example, if the UE configured with low priority for specific APN requests for Attach with a normal priority for a certain reason, the MME rejects the Attach request. However, if the UE configured with the low priority for specific APN requests for Attach with the low priority, the MME accepts the Attach request and performs the attach procedure with the UE.

The UE configured with the low priority, i.e. the UE which has established a low priority PDN connection with the current network, may attempt transmitting normal priority data.

In this case, the UE may change the low priority PDN connection for normal priority PDN connection, i.e. transmit a NAS message request for overriding to the network, and the network accepts or rejects the request form the UE depending on whether the APN configured to the current PDN connection is available for overriding to the normal priority.

In the case of rejecting the request form the UE, the network sends the UE a reject message including a cause value notifying the reject cause in response to the NAS message request. The UE detaches from the network or maintain the low priority depending on the cause value of the reject message. The operations to be performed by the UE may be indicated in the reject message or configured in the UE. The network may perform a network initiated detach procedure at the same time of transmitting the reject message to the UE.

As described above, the network entity controlling the low priority and normal priority of the UE may be MME or PCRF depending on the embodiment of the present invention.

The MME may receive the subscriber information (subscription data) of the UE from the HSS, and the subscriber information may include the following informations as the change information related to the overriding of the UE.
(1) whether UE can use normal priority
(2) whether APN support low priority
(3) whether APN supporting low priority can be used with normal priority, i.e. whether overriding is possible (when overriding to the normal priority, it is possible to define APN-AMBER value of normal priority.)
This can be described as follows.

The subscriber information (subscription data) transmitted by the HS S may include the following indication or description to include the low priority and low priority overriding-related content.

That is, the APN-configuration Attribute-Value Pair (AVP) in the APN Configuration Profile AVP as a sub AVP of the subscriber information AVP may further include two new AVPs (i.e. Low priority indication AVP and Low priority overriding flag AVP) proposed in the present invention.

Here, the Low priority indication AVP indicates whether the corresponding APN supports low priority, and the Low priority overriding flag AVP indicates whether the corresponding APN supports switching to the normal priority, i.e. overriding, when the APN supports the low priority. In the case that the low priority overriding is supported for the corresponding APN, it is possible to define the APN-AMBR for use in overriding to the normal priority separately.

FIG. 11 is a diagram illustrating an APN-configuration AVP defined newly in the present invention. Referring to FIG. 11, the Low priority indication 1110 indicating whether the APN supports the low priority, the Low priority overriding flag 1120 indicating whether the APN supports overriding to the normal priority, and the APN-AMBR for normal priority 1130 configured for the normal priority are added as described above.

The MME or PCRF may determine whether to override the low priority PDN connection to the normal priority connection according to the request of the UE based on the above information.

Figure 12:
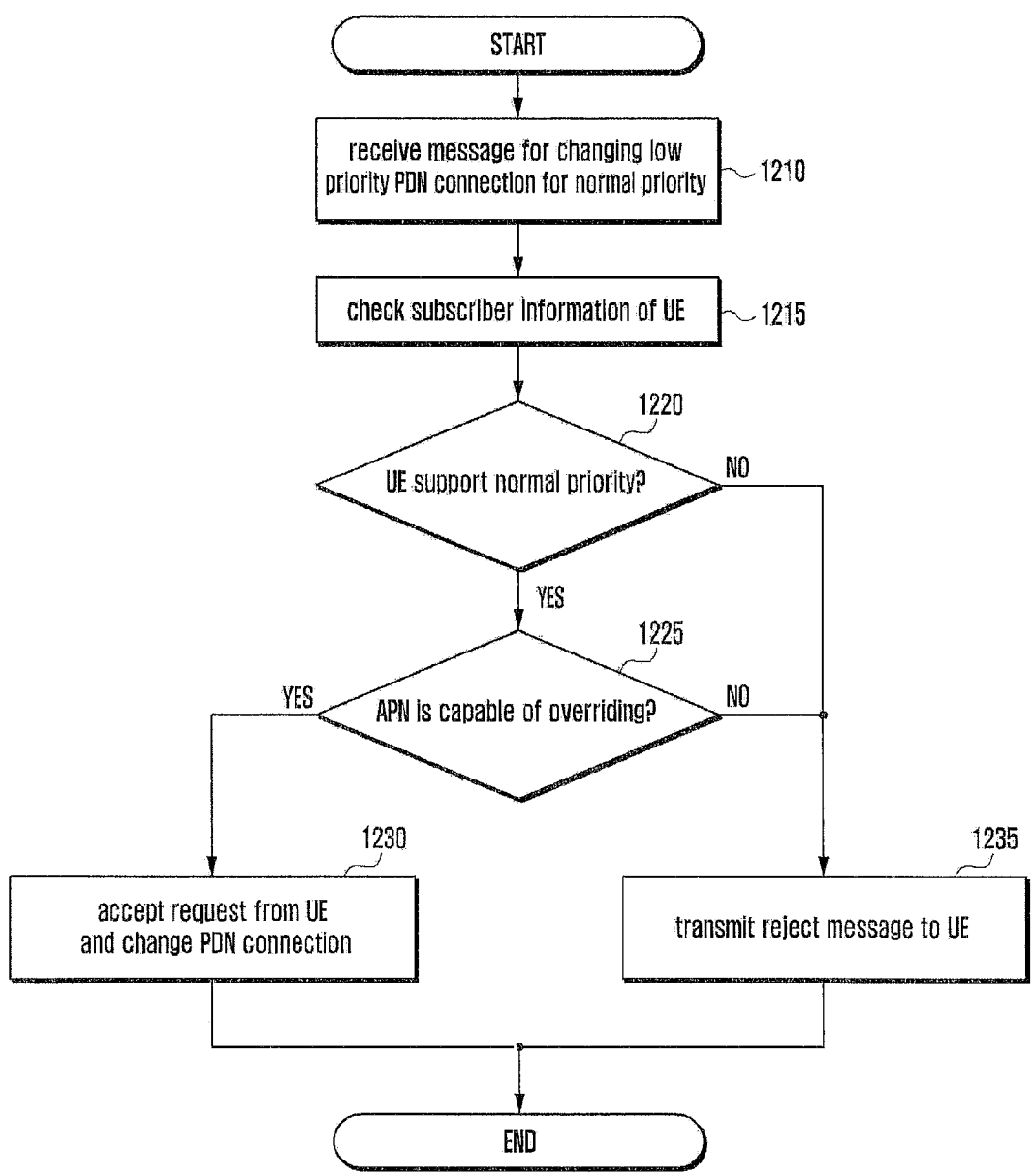
FIG. 12 is a flowchart illustrating a procedure for the MME to processing the overriding request of the UE.

FIG. 12 is a flowchart illustrating a procedure for the MME to processing the overriding request of the UE.

Referring to FIG. 12, the MME receives a NAS message for changing the current low priority PDN for the normal priority from the UE at step 1210. Next, the MME checks the subscriber information of the UE at step 1215. The subscriber information includes the aforementioned change information, i.e. whether the user is capable of transmitting data with normal priority, whether the APN support the low priority, and whether the APN supports overriding.

The MME determines whether the UE is allowed for use of the normal priority based on the subscriber information of the UE at step 1220. If the UE is not allowed for use of the normal priority, the MME sends the UE a reject message with a cause value at step 1235. The MME may perform an operation depending on the cause value.

If the UE is allowed for use of the normal priority at step 1220, the MME determines whether determines whether the APN supports overriding based on the UE's subscriber information stored in the HSS at step 1225. If the APN supports overriding, the MME accepts the change request of the UE and changes the current low priority PDN connection to the normal priority at step 1230. If the APN does not support overriding at step 1225, the MME sends the UE a reject message at step 1235. The reject message includes a cause value, and the MME performs an operation depending on the cause value.

Figure 13:
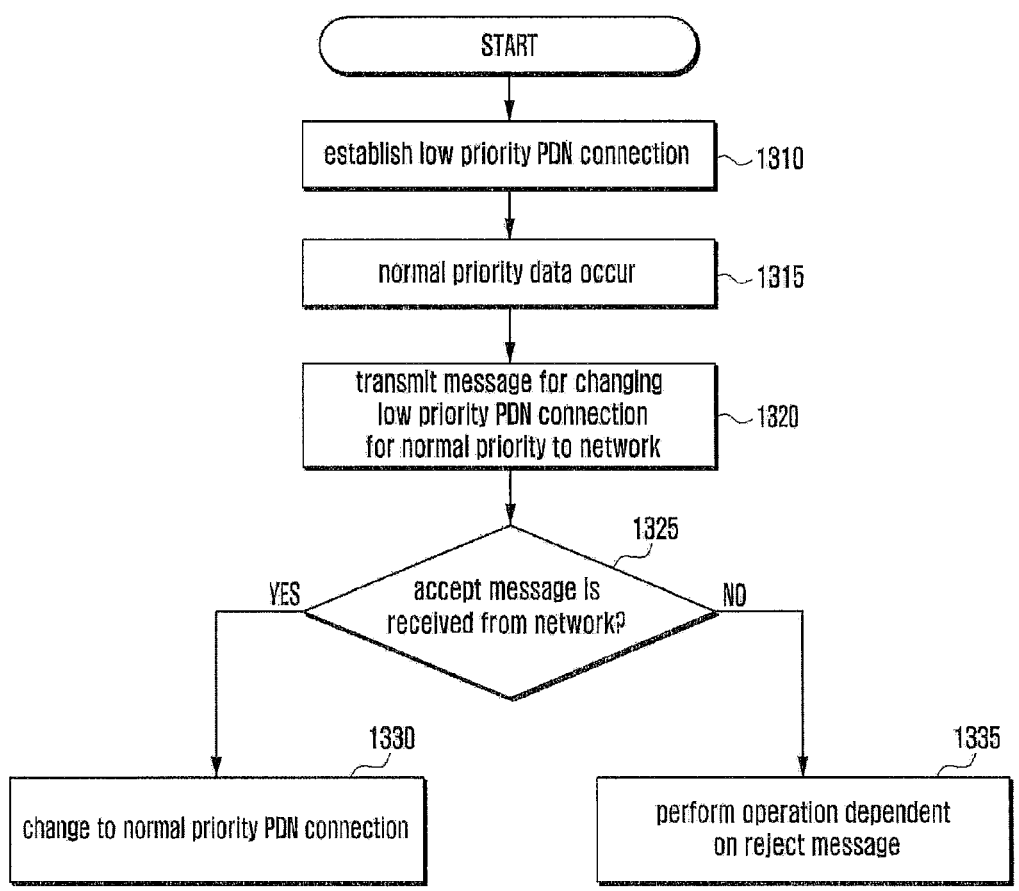
FIG. 13 is a flowchart illustrating a procedure for the UE to operate depending on the response received from the network in reply to the overriding request.

FIG. 13 is a flowchart illustrating a procedure for the UE to operate depending on the response received from the network in reply to the overriding request. In the embodiment of FIG. 13, the network entity handling the request of the UE may be an MME.

Retelling to FIG. 13, the UE is in the state of having established low priority PDN connection with the network at step 1310. If any normal priority data to be transmitted to the network occurs at step 1315, the UE sends the network a NAS message for changing the current low priority PDN connection to the normal priority at step 1320.

If an overriding accept message is received from the network, i.e. MME at step 1325, the UE changes the current low priority PDN connection for the normal priority PDN connection at step 1330. Otherwise if a reject message is received, the UE performs an operation depending on the cause value of the reject message at step 1335.

If the UE in use of the low priority PDN connection transmits a normal priority PDN Connectivity Request, the MME forwards the request to the PGW, and the PGW may store the information.

In detail, if the low priority UE transmits the normal priority PDN Connectivity Request, the MME may sends the PGW a PND connection establishment message (e.g. Create Session Request) including at least one of the following informations.

(1) normal priority indicator received from UE
(2) normal priority indicator generated by MME after checking normal priority request
(3) low priority overriding indicator included in subscriber information of UE
(4) omission of low priority indicator included in legacy low priority PDN connection establishment message Particularly in (4), if the low priority indicator is omitted in the PDN connection establishment message, the PGW may regard this as normal priority PDN Connectivity Request.

The PGW may store the above information for use in generating the billing data for normal priority PDN connection or access control.

Figure 14:
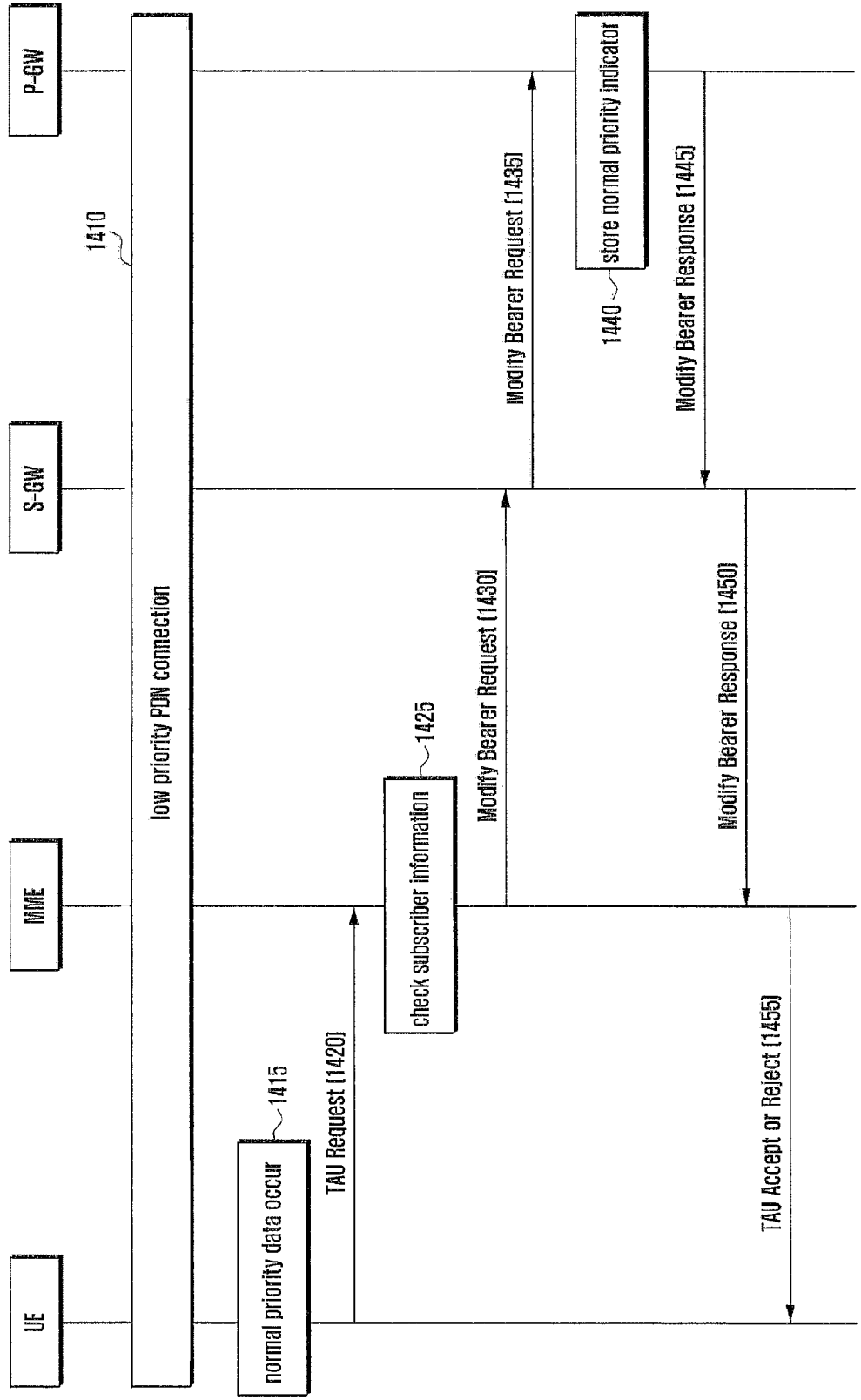
FIG. 14 is a signal flow diagram illustrating a normal priority data transmission in the state that the UE has established a low priority PDN connection with the network.

FIG. 14 is a signal flow diagram illustrating a normal priority data transmission in the state that the UE has established a low priority PDN connection with the network.

In detail, FIG. 14 is shows a situation in which the UE transmits a NAS message including the normal priority indicator for changing the low priority PDN connection for the normal priority PDN connection and then the MME determining whether to accept the overriding based on the subscriber information of the UE. The PCRF and HSS that do not participate in the overriding procedure of the UE are omitted in the drawing.

Referring to FIG. 14, a low priority PDN connection is established between the UE and the network at step 1410. If any data to be transmitted with the normal priority occurs at the UE at step 1415, the UE sends the MME a TAU request including the normal priority indicator at step 1420.

The MME checks the UE's subscriber information stored in the HSS to determine whether to accept the overriding at step 1425 and sends the SGW a Modify Bearer Request including the normal priority indicator at step 1430. The SGW forwards the Modify Bearer Request to the PGW at step 1435, and the PGW stores the normal priority indicator for use in billing at step 1440.

Next, the PGW sends the SGW the Modify Bearer Response at step 1445, and the SGW forwards the Modify Bearer Response to the MME at step 1450. The MME sends the UE a TAU Accept or Reject depending on the subscriber information of the UE at step 1455.

Although the embodiment of FIG. 14 is directed to the case where the NAS message transmitted from the UE to the MME is the TAU Request, other NAS messages may be used. Although the embodiment of the present invention is directed to the case where the MME sends the PGW the Modify Bearer Request message as a message for changing the PDN connection, other messages may be used. The messages used in the embodiments of the present invention are not limited to the legacy message formats but defined as new RRC/NAS messages.

Meanwhile, the overriding request of the UE may be processed by the PCRF in the stead of the MME and, in this case, the PCRF receives the connection change request transmitted by the UE and determines whether to change the low priority PDN connection to the normal priority PDN connection based on any of the information received from the HSS (e.g. subscriber information of the UE) and the information it has or combination of these information. If the message including the normal priority indicator is received from the PCRF, the PGW stores the normal priority information for use in billing.

In the case of being required to transmit normal priority data in the state that the low priority PDN connection has been established with the network, the UE may detach the current PDN connection, instead of overriding as described above, and then establish a normal priority PDN connection.

Figure 15:
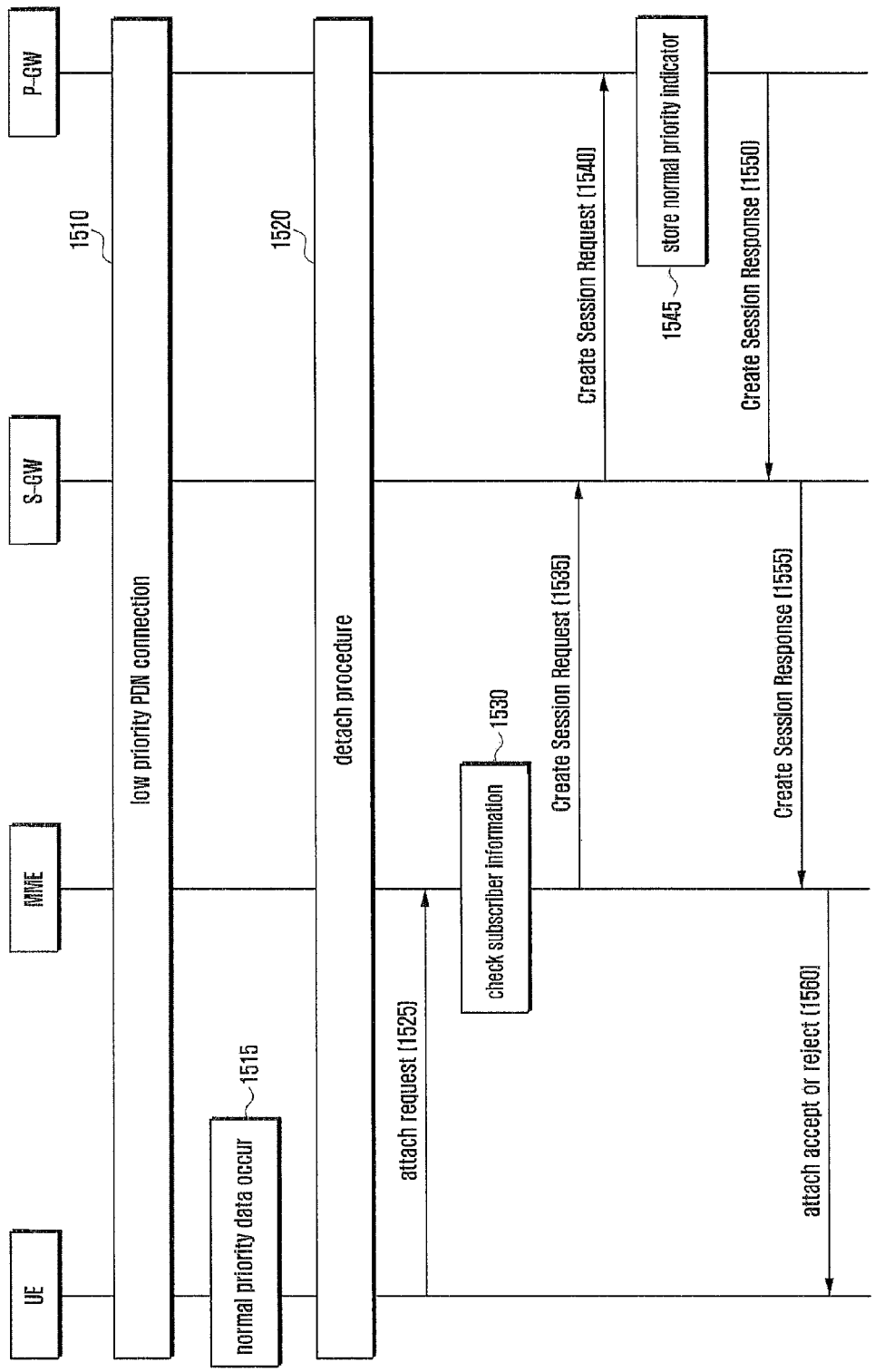
FIG. 15 is a signal flow diagram illustrating a procedure for the UE to establish a new PDN connection with the network for transmitting normal priority data.

FIG. 15 is a signal flow diagram illustrating a procedure for the UE to establish a new PDN connection with the network for transmitting normal priority data.

Referring to FIG. 15, the UE and the network establish a low priority connection at step 1510. If normal priority data is generated by any application installed in the UE, the UE performs a process of releasing the low priority PDN connection at step 1520.

Next, the UE sends the network, i.e. MME, a NAS message of attach request including a normal priority indicator as access priority information at step 1525. The MME checks the subscriber information included in the HSS to verify allowance for normal priority data transmission at step 1530 and sends the SGW a Create Session Request including the normal priority indicator at step 1535. The SGW forwards the Create Session Request including the normal priority indicator to the PGW at step 1540, and the PGW stores the normal priority indicator in association with the current PDN connection for use in billing at step 1540.

Afterward, the PGW sends the MME a Creation Session Response via the SGW at steps 1550 and 1555, and the MME sends the UE an attach accept or reject in response to the normal priority PDN Connectivity Request depending on the check result of the UE's subscriber information at step 1560. The attach reject may include a cause value which indicates the operation to be taken by the UE, e.g. detach from the network.

Figure 16:
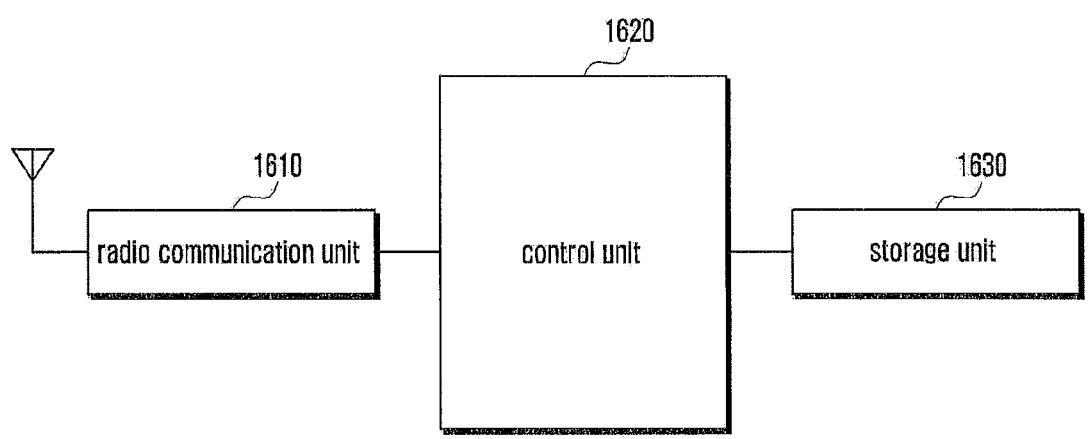
FIG. 16 is a block diagram illustrating a configuration of a data transmission apparatus, i.e. UE, according to the present invention.

FIG. 16 is a block diagram illustrating a configuration of a data transmission apparatus, i.e. UE, according to the present invention. Referring to FIG. 16, the UE may include a radio communication unit 1610, a control unit 1620, and a storage unit 1630.

The radio communication unit 1610 is responsible for transmitting and receiving data and message to and from the network. Particularly in an embodiment of the present invention, the radio communication unit 1610 may transmit messages and data such as connection request and connection change request to the network under the control of the control unit 1620. The radio communication unit 1610 also may receive the data such as access priority information transmitted by the network.

The control unit 1620 performs the procedure for the UE to transmit the normal priority data to the network according to an embodiment of the present invention. In detail, the control unit 1620 generates and transmits an attach request to the network for acquiring the access priority information of the UE from the network and stores the access priority information received form the network in the storage unit 1630.

If any data to be transmitted occurs at the UE, the control unit 1620 checks the access priority information corresponding to the data and transmits the data to the network depending on the access priority information. If the data is the normal priority data, the control unit 1620 transmits the data without the low priority indicator or with the normal priority indicator.

If any normal priority data occurs in the state that the UE has established the low priority PDN connection with the network, the control unit 1620 may perform a procedure of changing the low priority PDN connection for the normal priority PDN connection. The connection change procedure is performed as described in the above embodiment, and the control unit 1620 performs an operation in match with the change request accept or reject.

The storage unit 1630 stores the above described access priority information in addition to the UE-related informations associated with the conventional technology, and the access priority information is used in data transmission of the UE.

Figure 17:
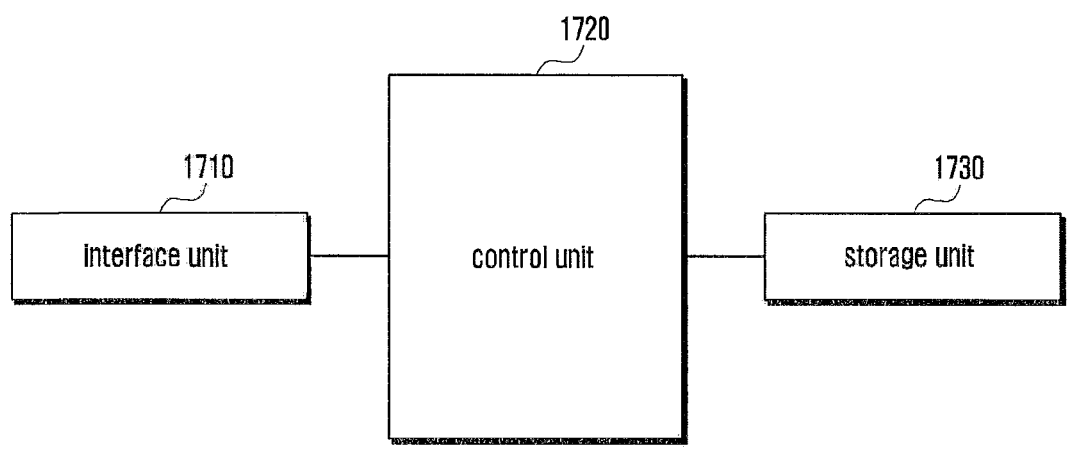
FIG. 17 is a block diagram illustrating a configuration of a data processing apparatus, i.e. MME of network entities, according to the present inventions.

FIG. 17 is a block diagram illustrating a configuration of a data processing apparatus, i.e. MME of network entities, according to the present inventions. Referring to FIG. 17, the MME may include an interface unit 1710, a control unit 1720, and a storage unit 1730.

The interface unit 1710 is responsible for transmitting and receiving signals and data to and from other network entities under the control of the control unit 1720. The control unit 1720 performs the operations of configuring access priority to the UE and processing data received from the UE according to the above-described embodiment.

In detail, if an attach request is received from the UE, the control unit 1720 may check the access priority information of the UE based on the subscriber information and determine whether to accept the data transmission based on the subscriber in the case that the UE transmits the data along with the access priority information.

If the UE transmits a request for changing the low priority PDN connection for the normal priority PDN connection, the control unit 1720 may determine whether to accept the change, i.e. overriding, based on the subscriber information of the UE.

The storage unit 1730 may store the UE's subscriber information provided by the HSS and/or preconfigured operator policy, the stored subscriber information and/or operator policy may be used in determining whether to accept the data transmission or connection change of the UE.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for transmitting low priority data to a network, the method comprising:
    transmitting, by a terminal, a connection request to the network;
    receiving, by the terminal, priority information for data transmission from the network;
    storing, by the terminal, the received priority information;
    transmitting, by the terminal, a change request for changing a low priority connection for the low priority data to a normal priority connection for normal priority data;
    receiving, by the terminal, a response indicating whether to allow the change to the normal priority connection from the network; and
    transmitting, by the terminal, the normal priority data through the normal priority connection.

2. The method of claim 1, wherein the priority information is determined per packet data network (PDN) connection between the terminal and the network, per an evolved packet system (EPS) bearer, or per internet protocol (IP) flow.

3. The method of claim 1, further comprising transmitting data to the network based on the stored priority information.

4. The method of claim 3, further comprising:
    checking the priority information corresponding to the data based on the stored priority information; and
    transmitting, when the priority information corresponding to the data is a normal priority, the connection request indicating that the data is normal priority data.

5. The method of claim 1, further comprising performing, when the response is a reject response, an operation depending on content of the reject response,
    wherein the operation dependent on the content of the reject response is one of detaching from the network and maintaining the low priority connection.

6. A method for processing low priority data, the method comprising:
    receiving a connection request from a terminal;
    checking priority information on data transmission of the terminal based on one of subscriber information of the terminal and an operator policy in response to the connection request;
    transmitting the checked priority information to the terminal;
    receiving, from the terminal, a change request for changing a low priority connection for low priority data to a nomal priority connection for normal priority data;
    determining whether the change to the normal priority connection is allowable based on change information of the terminal; and
    transmitting, when the change to the normal priority connection is allowable, an accept response to the terminal.

7. The method of claim 6, wherein the priority information is determined per packet data network (PDN) connection between the terminal and a network, per an evolved packet system (EPS) bearer, or per Internet protocol (IP) flow.

8. The method of claim 6, further comprising:
    receiving a connection request indicating the normal priority data from the terminal;
    checking whether the priority information included in the connection request matches at least one of subscriber information of the terminal and the operator policy; and
    transmitting, when the priority information included in the connection request matches the at least one of subscriber information and the operator policy, an accept response to the terminal in response to the connection request.

9. The method of claim 6, further comprising transmitting a normal priority indicator indicating the normal priority connection to a packet data network serving gateway (PGW) that stores the normal priority indicator.

10. The method of claim 6, wherein the change information comprises at least one of whether the terminal is capable of transmitting the normal priority data, whether an access priority network (APN) delivering the connection request of the terminal supports the low priority connection, and whether the APN supports changing the low priority connection for the normal priority connection.

11. An apparatus for transmitting data to a network, the apparatus comprising:
a radio communication unit configured to transmit and receive messages and data to and from the network;
a control unit configured to control:
transmitting a connection request to the network,
receiving priority information for data transmission from the network,
transmitting a change request for changing a low priority connection for low priority data to a nomal priority connection for normal priority data,
receiving a response indicating whether to allow the change to the normal priority connection from the network, and
transmitting the normal priority data through the normal priority connection; and
a storage unit configured to store the received priority information.

12. The apparatus of claim 11, wherein the priority information is determined per packet data network (PDN) connection between a terminal and the network, per an evolved packet system (EPS) bearer, or per internet protocol (IP) flow.

13. The apparatus of claim 11, wherein the control unit is configured to control transmitting data to the network based on the stored priority information.

14. The apparatus of claim 13, wherein the control unit is configured to check the priority information corresponding to the data based on the stored priority information and control transmitting, when the priority information corresponding to the data is a normal priority.

15. The apparatus of claim 11, wherein the control unit is configured to perform an operation depending on content of a reject response, when the response is a reject response, wherein the operation dependent on the content of the reject response is one of detaching from the network and maintaining the low priority connection.

16. An apparatus for processing data received from a terminal configured to transmit low priority data, the apparatus comprising:
an interface unit configured to transmit and receive messages and data to and from the terminal; and
a control unit configured to control:
receiving a connection request from the terminal,
checking priority information on data transmission of the terminal based on one of subscriber information of the terminal and an operator policy in response to the connection request,
transmitting the checked priority information to the terminal,
receiving a connection request for changing a low priority connection for low priority data to a normal priority connection for normal priority data,
determining whether the change to the normal priority connection is allowable based on change information of the terminal, and
transmitting, when the change to the normal priority connection is allowable, an accept response to the terminal.

17. The apparatus of claim 16, wherein the priority information is determined per packet data network (PDN) connection between the terminal and a network, per an evolved packet system (EPS) bearer, or per internet protocol (IP) flow.

18. The apparatus of claim 16, wherein the control unit is configured to control receiving a connection request indicating the normal priority data from the terminal, checking whether the priority information included in the connection request matches at least one of subscriber information of the terminal and the operator policy, and transmitting, when the priority information included in the connection request matches the at least one of subscriber information and the operator policy, an accept response to the terminal in response to the connection request.

19. The apparatus of claim 16, wherein the control unit is configured to control transmitting a normal priority indicator indicating the normal priority connection to a priority data network serving gateway (PGW) that stores the normal priority indicator.

20. The apparatus of claim 16, wherein the change information comprises at least one of whether the terminal is capable of transmitting the normal priority data, whether an access priority network (APN) delivering the connection request of the terminal supports the low priority connection, and whether the APN supports changing the low priority connection for the normal priority connection.

* * * * *